Dec. 1, 1970  R. J. NADALIN  3,544,271

PHENOL DETECTION PROCESS

Filed May 14, 1968

WITNESSES:
Leon M. Garman
James T. Young

INVENTOR
Robert J. Nadalin
BY Lee P. Johns
ATTORNEY

United States Patent Office 3,544,271
Patented Dec. 1, 1970

3,544,271
PHENOL DETECTION PROCESS
Robert J. Nadalin, Pittsburgh, Pa., assignor to Westinghouse Electric Corporation, Pittsburgh, Pa., a corporation of Pennsylvania
Filed May 14, 1968, Ser. No. 729,114
Int. Cl. G01n 31/22, 33/18
U.S. Cl. 23—230                                    10 Claims

ABSTRACT OF THE DISCLOSURE

A process for detecting the presence of a phenolic compound in water comprising the steps: admixing a sample of water suspected of containing a phenol with chloroform or other good solvent for the phenol to extract phenol from the water, separating the chloroform solution containing the phenol from the water, and admixing the chloroform-phenol solution with a reagent solution composed of an oxidizing agent reactive with phenolic hydroxy groups in concentrated sulfuric acid to produce a coloration in the solution when a phenol is present.

CROSS REFERENCE TO RELATED APPLICATIONS

This application is related to copending application Ser. No. 549,862, filed May 13, 1966.

BACKGROUND OF THE INVENTION

Field of the invention

This invention relates to a chemical process for detecting the presence of a phenolic compound in water, particularly when in dilute concentration.

Description of the prior art

The pollution of air and water streams, lakes, ponds, and wells has created a need for determining whether a particular contaminant is present therein and in what amount. In order to detect the presence of a specific type of chemical in a fluid, a test should be rapidly and conveniently, as well as economically, performed. That is particularly true for testing in the field where a contaminated fluid is present. Frequent tests may be required for chemical contaminants in air and water. A typical colorimetric water test requires the addition of selected chemical reagents to a water sample in proper sequence and quantity to produce color changes in the sample from which the analyst can determine whether or not a given constituent or class of compounds is present and in what amount.

More particularly, where water is suspected of being polluted it is often necessary to detect very low concentrations of a pollutant in the water in order to determine the source of the contamination and take appropriate remedial measures. Extremely small traces of phenol in drinking water can produce a very unpleasant taste, yet it is difficult to determine the quantity of phenol present in the field.

In the past the usual procedures for determining the presence of phenols in a fluid have been long and complicated and are normally conducted in laboratories in accordance with standard procedures where precision chemical apparatus is employed using reagents for testing stored in labeled bottles. Briefly, precise amounts of the reagents are measured out by the use of laboratory balances, pipetes and/or graduates, and these reagents in turn are handled and mixed with the water being tested in chemical glassware. When the test, which may involve colorimeters, is completed, the glassware must be cleaned, the reagent bottles are returned to storage, and other equipment is returned to its original state. All of the foregoing procedures involve appreciable time and effort and cannot be conveniently performed outside of the laboratory.

It has been found in accordance with this invention that the foregoing disadvantages may be overcome very simply and rapidly by the use of a reagent consisting essentially of a solution of a vanadate ion in sulfuric acid, which is admixed with a chloroform-phenol solution derived by extracting the phenol-contaminated water with chloroform.

Accordingly, it is a general object of this invention to provide a process for detecting a phenolic compound in certain fluids, which process is expedient, inexpensive and positive.

It is another object of this invention to provide a process for detecting a phenol in water, which process is sensitive to the detection of low concentrations of a phenol.

Finally, it is an object of this invention to accomplish the foregoing objects and desiderata in a simple and effective manner.

SUMMARY OF THE INVENTION

Generally the process of the present invention involves a two step procedure comprising the steps of (a) admixing a sample of the fluid suspected of containing a phenol with a small volume of an organic solvent, such as chloroform or carbon tetrachloride, that is (1) a good solvent for phenol, (2) not significantly miscible with the fluid, and (3) which itself does not react with the reagent in step (b), and (b) admixing the solution of organic solvent containing a relatively high concentration of the phenol with a reagent composed of a non-aqueous solution of sulfuric acid and an oxidizing agent, composed of at least one compound selected from a group consisting of a vanadate ion and a chromate ion, which reacts with a phenol to produce a colored reduction product, whereby to produce an intense coloration depending on the quantity of the phenol.

The term "phenolic compounds" as used herein, hereinafter for briefness designated as "phenol," include pure or impure hydroxy benzenes, cresols, cresylic acid, alkyl derivatives of hydroxy benzenes and compounds containing hydroxy groups attached to benzene rings, and mixtures thereof.

BRIEF DESCRIPTION OF THE DRAWING

For a better understanding of the nature and objects of this invention, reference is made to the following detailed description and drawings, in which.

Similar numerals refer to similar parts throughout the views of the drawings.

DESCRIPTION OF THE PREFERRED EMBODIMENTS

Figure 1:
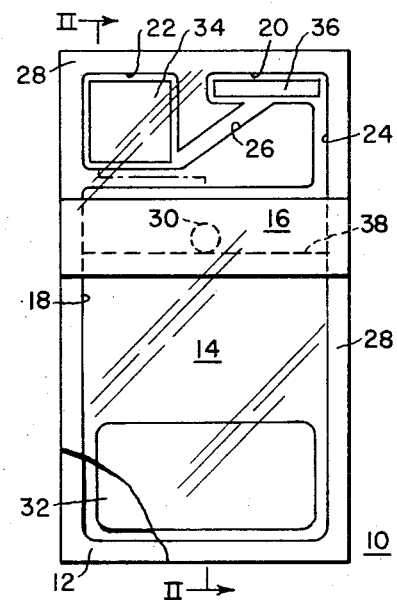
FIG. 1 is a top plan view of one embodiment of a fluid sampler for detecting phenolic contaminants in fluids and showing a peelable cover sheet intact.

The process for detecting for the presence of a phenol in a liquid such as for example where phenol is a contaminant in water, basically involves three steps. The first step involves the extraction of a phenol from a sample of water by shaking the sample with an organic solvent which is immiscible with water and which has a greater solubility for the phenol than water. That is, the organic solvent must be a better solvent for the phenol than water and should readily produce a solution with a far higher concentration of phenol than with water. Chloroform is a particularly good organic solvent for this purpose. When shaking is complete the organic solvent containing substantially all the phenol separates from the water due to their immiscibility with each other. For the second step it is necessary that the phenol-containing organic solvent be separated from the water, because the water would react adversely with the reagent used in succeeding steps and would prevent the desired colorimetric test from occurring in reponse to the presence of the phenol.

The third step is the admixing of the phenol-containing organic solvent with a reagent composed of a concentrated solution of sulfuric acid and an oxidizing agent selected from a group consisting of a vanadate ion and a chromate ion. The success of the third step is dependent upon the oxidation of the phenol by the oxidizing agent in the absence of water. In the third step the reactions involved are indicated by the following formulas:

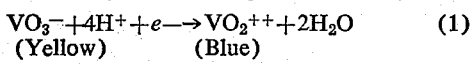
(Yellow)   (Blue)   (1)

   (2)

As shown in the formulas a gain of an electron in Formula 1 causes the reduction of the vanadate ion ($VO_3^-$) having a yellow color, the vanadyl ion ($VO_2^{++}$) having a blue color. The resulting appearance of the reaction is a green color resulting from a blending of the yellow and blue ions in the solution. The electron gained in Formula 1 is accounted for by a loss of electron by the phenol as shown in Formula 2.

The organic solvent used in the first step has three requirements, namely: (1) is that it is immiscible with the liquid (water) which is suspected of containing a phenol, (2) that it readily dissolves the phenol and can form a concentrated solution thereof, and (3) that the solution itself does not react with the reagent which is subsequently used in the last step. As examples, suitable organic solvents are chloroform ($CHCl_3$) and/or carbon tetrachloride ($CCl_4$).

When the sample being tested is water, the organic solvent has a greater attraction for the phenol than the water and substantially completely extracts all of the phenol from the water. When the extraction is completed and the liquids are allowed to settle, the organic solvent (usually having a materially higher density, i.e. 1.5 to 1.6) is disposed as a distinct layer at the bottom of the container below the water. Substantially all water is thereby eliminated from the organic solvent, which is necessary for the successful practice of the final step of the test. Water should not be present in the phenol-organic solvent solution when the latter is reacted with the reagent, since the water would interfere with the action of the oxidizing agent.

After the immiscible layers are formed, the water, or other liquid, being tested may be separated from the phenol-organic solvent layer and discarded. Other techniques may be adopted to enable an independent reaction between the organic solvent-phenol solution and reagent without interference from the water. Thus, the solvent-phenol solution may be withdrawn from the vessel by any suitable means.

The reagent is composed of a saturated solution of a selected highly oxidizing agent reactive with phenolic hydroxy groups, in concentrated sulfuric acid, 95% $H_2SO_4$ or higher. The oxidizing agent may be one of a number of agents including the vanadate ion and the chromate ion, such as in the form of ammonium vanadate ($NH_4VO_3$), sodium vanadate ($NaVO_3$), vanadium pentoxide ($V_2O_5$), potassium dichromate ($K_2Cr_2O_7$). Potassium permanganate ($KMnO_4$) also may be used as an oxidizing agent, however, it is not recommended because of its potentially explosive properties in the presence of concentrated sulfuric acid. Also, the ceric ion ($Ce^{+4}$) and the ferric ion ($Fe^{+3}$) may be used although they result in less desirable test colorations. When the reagent is mixed with the organic solution containing a phenol, the negative radical of the oxidizing agent such as the vanadate ion ($VO_3^-$) changes color by gaining an electron from the hydroxy group of the phenol, indicating the presence of a phenol in the original sample of liquid or water. If on the other hand no color change occurs during the step there is an indication that no phenol is present.

During the test the organic solvent such as chloroform merely acts as a solvent in gathering or extracting substantially all of the phenol from the original liquid to be tested such as water and concentrates it into a smaller volume of solvent. The chloroform forms an immiscible mixture and thereby does not carry over water to the subsequent reaction with the reagent.

The test may be carried out in any number of kinds of equipment. For example, the foregoing procedure can be readily carried out using ordinary laboratory equipment such as a separatory funnel and a spot plate. The test may be performed most readily in the field in a water sampler such as that generally indicated at 10 in FIGS. 1 and 2. It comprises an elongated, relatively flat, laminated package including a base sheet 12, a retainer sheet 14, the sheets 12 and 14 being coextensive, and a cover sheet 16.

For construction purposes as well as for convenient handling of the sampler 10, the base sheet 12 is a molded member having an elongated chamber 18, a compartment 20, and a pocket 22. The chamber 18 and the compartment 20 are connected by a channel 24. Likewise, the pocket 22 communicates with the compartment 20 through a channel 26. The portions of the base sheet 12 between the several molded portions 18 to 26 are sealed to the adjoining surface of the retainer sheet 14. Likewise, the peripheral portions of the sheets 12 and 14 are sealed together, such as by the application of heat and pressure from a die to the sheets 12 and 14, or by adhesives or other means known in the art. The peripheral portion 28 is sealed together in a fluid-type manner.

The base sheet 12 and the retainer sheet 14 are composed of material that is flexible, insoluble in and impermeable to the fluids employed, such for example as a metal foil. The sheets may also be composed of a synthetic plastic film, for instance of a fluorinated polymer such as monochlorotrifluoroethylene polymer, polytetrafluoroethylene and fluorinated vinyl resin, and are sold under the trademarks Kel-F, Teflon, (FEP), and Aclar, respectively. The sheets 12 and 14 may have a thickness ranging from 8 to 20 mils with a preferred range of 4 to 10 mils and an optimum thickness being from 5 to 7 mils. The thickness depends upon the stiffness and strength of the material used. As mentioned previously, the sheet should be impermeable, insoluble in the liquids being used, and have good flexibility and sealing qualities so that the base sheet 12 and the retainer sheet 14 may be tightly bonded together. If the sheets are excessively thick, they cannot be as readily sealed together to provide for fluid tight seals between the several chambers, compartments and channels as indicated. The base sheet 12 preferably is pigmented so as to present a background color such as white to enable the user to more readily see any color change. It is molded to provide the several chambers, compartments, pockets and channels. The retainer sheet 14 should be transparent.

The cover sheet 16 is detachably secured to the upper side of the retainer sheet 14. The cover sheet 16 is composed of an impervious material such as a metal foil or an adhesive cloth. The cover sheet 16 seals a fluid inlet 30 in the retainer sheet 14 to prevent contamination from the atmosphere of the interior of the sampler during storage and prior to actual use.

The presence of some chemical contaminants in water may not be easily determined by direct colorimetric reaction because of the difficulty in using the sample as normally received, such as muddy water. The process extracts the phenol into the chloroform, leaving the mud in the water. Colorimetric testing is useful because of its inherent simplicity and sensitivity. Also, colorimetric testing is capable of giving an approximate indication of the amount of contaminant present.

The sampler 10 is particularly useful for a class of contaminants which involve a process of preliminarily separating or extracting the contaminant from the liquid sample, such as water. For that purpose, a solvent that is immiscible in the suspected sample such as water is first dispersed in the sample, as by shaking, and then allowed to separate. During the shaking stage, the contaminant is drawn out of the water and is concentrated in a smaller volume of solvent. After separation, the colorimetric determination is made for the contaminant in the solvent rather than in the water. Thus, it is possible to concentrate the contaminant and increase the test sensitivity by limiting the amount of solvent, as well as to eliminate the interfering water.

The sampler 10 is particularly adapted by reasons of convenience and rapidity to test in the field a liquid, such as river water, for the presence of a phenol. For that purpose the chamber 18 contains a sack 32 filled with the organic solvent such as chloroform or carbon tetrachloride. The sack 32 comprising a fluorinated resin such polytetrafluoroethylene and polytrifluoromonochloroethylene which is rupturable material upon manually squeezing the base sheet 12 and the retainer sheet 14 together at the desired time. The pocket 22 contains a vial 34 containing the reagent which is preferably composed of a saturated solution of ammonium vanadate in concentrated sulfuric acid. The vial 34 may be composed of a thin glass because of the corrosive nature of the reagent. It is readily fractured when the chloroform-phenol solution is present. The compartment 20 contains a strip 36 of absorbent material, such as glass fiber or silica gel paper, and serves as a reaction zone for the reagent and the phenol.

An example of the manner in which the test is performed is set forth in the following example:

EXAMPLE

A sample containing 100 ml. of phenol containing water is taken into the chamber 18. The cover sheet 16 is then replaced over the inlet 30 to prevent leakage of the sample during subsequent testing procedure and to establish a sealed air pressure within the sampler. The sack 32 containing 5 ml. of chloroform is then broken by manually squeezing the sheets 12 and 14 together whereupon the sack is broken. The sampler is then shaken vigorously to mix the chloroform with the water sample, whereby the chloroform extracts substantially all of the phenol in the water sample and concentrates it 20 fold. The solution of the phenol and chloroform is immiscible and heavier than the water and rapidly settles as a layer 40 below the water sample 38 when shaking of the sampler is terminated.

Figure 2:
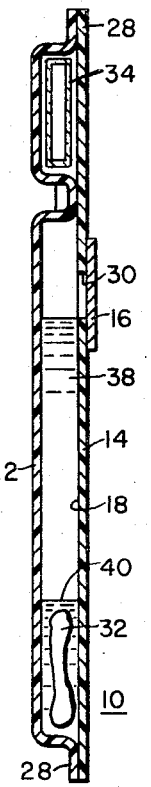
FIG. 2 is an enlarged fragmentary vertical sectional view taken on the line II—II of FIG. 1.

The layer 40 of phenol and chloroform is brought into contact with the absorbent strip 36 by rotating the sampler clockwise as viewed in FIG. 1. During an initial rotation, the upper layer of water 38 flows partially into the channel 24, but is prevented from reaching the strip 36 by squeezing the portions of the sheets 12 and 14 above and below the vial 34 to block the channel 24. Continued rotation of the sampler 10 brings the chloroform layer 40 into position adjacent the lower end of the channel 24. At that point the water in the channel is allowed to float out and any traces can be expelled by additional squeezing of the sampler to force all of the water out of the channel 24. Thereafter the chloroform-phenol solution is admitted to chamber 20 and strip 36 is saturated.

Squeezing of the sampler over the vial 34 will cause it to rupture and the reagent comprising a saturated solution of ammonium vanadate in concentrated sulfuric acid is released. The reagent passes through the channel 26 to the strip 36 after the vial 34 is ruptured, the squeezing pressure in the sampler is released and more of the phenol-chloroform solution 40 is drawn into the channel 24 and mixes with the reagent in the strip 36 which causes a change in color of the reagent from yellow to green as it reacts with the phenol. The depth of color can be compared with a color chart made from tests from different standard water-phenol mixtures. A chart of the color for each of five or so concentrations can be compared with the test in the sampler and a reasonably accurate value for the phenol concentration in the water can be arrived at. The entire test can be completed within a two minute period.

Accordingly, the process of the present invention provides for a readily feasible procedure for testing fluids such as water for the presence of a phenol. It has been found that contaminants of the phenolic class of compounds can be detected where there is as little as 2.5 micrograms of phenol ($C_6H_5OH$) per ml. of chloroform. Since the chloroform extraction concentrates the phenols from a large volume of water, detection of about as little as 0.25 p.p.m. phenol in water is possible. Moreover, fluids other than water may be tested. Where a sampler of the type shown in the drawings is used it is disposed of after a single test use. If a permanent record of the test is desired, the resulting reaction may be recorded by color-sensitive photographic means.

It is understood that the above specification and drawings are merely exemplary and not in limitation of the invention.

What is claimed is:

1. A process for testing for the presence of a phenol in a liquid comprising the steps of extracting the phenol from a sample of a liquid suspected of containing a phenol by admixing the liquid with an organic solvent having a high solubility for phenol, wherein said organic solvent is immiscible with the liquid to form a separate layer of a solution of the organic solvent and the phenol and a layer of the liquid, and admixing the solution containing only the organic solvent and the phenol with a reagent consisting essentially of a solution of concentrated sulfuric acid and at least one oxidizing agent capable of changing color in the presence of a phenol, the organic solvent being non-reactive with the reagent, whereby to produce a change in coloration to indicate the presence of a phenol.

2. The process of claim 1 wherein the organic solvent is at least one compound selected from a group consisting of chloroform and carbon tetrachloride.

3. The process of claim 1 wherein the liquid being tested for phenol is water.

4. The process of claim 1 wherein the solvent-phenol layer is separated from said layer of liquid.

5. The process of claim 1 wherein the immiscible layer of the solution of the organic solvent and a phenol is much smaller in volume than the layer of liquid whereby the solvent has a higher concentration of phenol than in the liquid being tested.

6. The process of claim 1 wherein the reagent is a solution of vanadate ions in concentrated sulfuric acid.

7. The process of claim 1 wherein the reagent is a saturated solution of potassium dichromate in concentrated sulfuric acid.

8. The process of claim 1 wherein the reagent is a saturated solution of vanadate ions in concentrated sulfuric acid.

9. The process of claim 8 in which the vanadate ions are derived from ammonium vanadate.

10. A process for testing for the presence of a phenol in water comprising the steps of extracting the phenol from a sample of water by admixing the water with chloroform to form separate layers of the water and the solution of chloroform containing the phenol, and admixing the chloroform containing the phenol with a reagent consisting essentially of a solution of concentrated sulfuric acid and ammonium vanadate, whereby a change in coloration indicates the presence of a phenol.

References Cited

Spencer et al.: "Cerium (IV) Sulfate Oxidation of Phenols"; Analytical Chemistry; vol. 26, No. 5, May 1954, pp. 919–920.

Soloway et al.: "Improved Ferric Chloride Test for Phenols"; Analytical Chemistry; vol. 24, No. 6; June 1952; pp. 979–983.

Sommer: "Some Analytical Reactions of Polyhydric Phenols"; Analytical Abstracts; vol. 9; 1962; No. 4555.

Schnaiderman et al.: "Action of Phenols on a Series of Ions"; Analytical Abstracts; vol. 6; 1959; No. 18.

MORRIS O. WOLK, Primary Examiner

B. S. RICHMAN, Assistant Examiner

U.S. Cl. X.R.

252—408